(12) United States Patent
McPheeters (10) Patent No.: US 9,995,333 B2
(45) Date of Patent: Jun. 12, 2018

(54) DEVICES, SYSTEMS, AND METHODS FOR SECURING A COMPONENT TO A SURFACE

(71) Applicant: Sunrun South LLC, San Luis Obispo, CA (US)

(72) Inventor: Greg McPheeters, Santa Cruz, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 187 days.

(21) Appl. No.: 14/854,216

(22) Filed: Sep. 15, 2015

(65) Prior Publication Data

US 2016/0010680 A1   Jan. 14, 2016

Related U.S. Application Data

(63) Continuation of application No. 13/934,817, filed on Jul. 3, 2013, now Pat. No. 9,151,315.

(51) Int. Cl.

| | |
|---|---|
| *F16B 37/14* | (2006.01) |
| *F16B 17/00* | (2006.01) |
| *F16B 33/00* | (2006.01) |
| *F16B 5/02* | (2006.01) |
| *F16B 37/04* | (2006.01) |

(52) U.S. Cl.
CPC ............ *F16B 37/14* (2013.01); *F16B 5/0275* (2013.01); *F16B 33/004* (2013.01); *F16B 37/041* (2013.01)

(58) Field of Classification Search
CPC ...... F16B 37/14; F16B 33/004; F16B 5/0275; F16B 37/041

USPC ........ 52/293.3, 295, 296, 297, 299; 411/389
See application file for complete search history.

(56) References Cited

U.S. PATENT DOCUMENTS

| | | | |
|---|---|---|---|
| 1,024,127 A | 4/1912 | Gadd | |
| 1,046,600 A | 12/1912 | Kahler | |
| 1,864,080 A * | 6/1932 | Madge .................... | F16F 1/445 |
| | | | 267/141.4 |
| 1,938,153 A | 12/1933 | Reeves | |
| 3,318,622 A | 5/1967 | Crumpler | |
| 4,860,513 A | 8/1989 | Whitman | |
| 5,002,318 A * | 3/1991 | Witter ..................... | F16L 27/12 |
| | | | 169/37 |
| 5,697,650 A | 12/1997 | Brown | |
| 5,803,693 A | 9/1998 | Choiniere et al. | |
| 5,885,034 A | 3/1999 | Fergusson | |
| 6,282,857 B1 | 9/2001 | Rubenacker | |
| 8,393,601 B2 * | 3/2013 | de Mola .................. | F16B 5/01 |
| | | | 267/141.5 |

(Continued)

*Primary Examiner* — Phi D A (74) *Attorney, Agent, or Firm* — Kramer Levin Naftalis & Frankel LLP (57) ABSTRACT

Devices, systems, and methods for securing a component to a surface are disclosed. The fastening device can include a base member having a threaded projection extending from a base plate. A base sealing gasket can be provided between the base plate and a surface on which the base plate is mounted to ensure a water-tight fit. A capping nut having a nut aperture can be threadably engaged to the treaded projection, and a structural fastener can be inserted through the nut aperture for securing a structural component of a building-mounted structure. A nut sealing gasket can be disposed between within the capping nut to ensure a water-tight fit between the capping nut and the base member.

18 Claims, 6 Drawing Sheets

(56) References Cited

U.S. PATENT DOCUMENTS

2010/0300022 A1* 12/2010 Espinosa ............... E04C 5/08
   52/236.3
2013/0089388 A1  4/2013 Liu et al.

* cited by examiner

DEVICES, SYSTEMS, AND METHODS FOR SECURING A COMPONENT TO A SURFACE

BACKGROUND OF THE DISCLOSURE

Building-mounted structures are typically secured to a building surface with one or more fastening devices. Such fastening devices often penetrate the building surface in order to adequately secure the structure to the building. For example, solar panel installations can be secured to rooftop surfaces by penetrating the roof surface with screws or other fasteners. Adequately securing the solar panel installation to the surface is critical to protect the panels and surrounding property from damage caused by wind and/or seismic activity, both of which could cause damage if the solar panel system is not properly secured to the surface. Penetrating a building's surface, however, can lead to various adverse issues including the ingress of moisture.

SUMMARY OF THE DISCLOSURE

Devices, systems, and methods for securing a component to a surface are disclosed. The disclosed fastening devices can provide a water-tight mounting point for a building-mounted structure, such as a solar panel installation, for example. Such fastening devices can include a base member having a base plate and a hollow, threaded projection. The hollow, threaded projection can receive a surface fastener for fastening the base member to a building surface. A capping nut having a centrally-located aperture can threadably engage the threaded projection to seal the fastening device from ingress of moisture. A structural fastener can be inserted into the centrally-located aperture for securing a building-mounted structure to the fastening device.

In some embodiments, a base sealing gasket can be disposed between the base member and the building surface to prevent moisture from entering the building via the hole created by the surface fastener. The base sealing gasket can be pliable to conform to imperfections in the building surface and/or the fastening device in order to create a water-tight seal. Additionally or alternatively, a nut sealing gasket can be disposed between the base member and the capping nut to prevent moisture from entering the fastening device via the aperture of the capping nut. This nut sealing gasket may be similar or identical to the base sealing gasket. Further, an O-ring can be provided around a proximal end of the hollow, threaded projection to seal off the joint between the capping nut and the base member.

BRIEF DESCRIPTION OF THE DRAWINGS

The above and other objects and advantages of the invention will be apparent upon consideration of the following detailed description, taken in conjunction with the accompanying figures, in which like reference characters refer to like parts throughout, and in which.

DETAILED DESCRIPTION OF THE DISCLOSURE

Reference will now be made in detail to the embodiments of the present invention, examples of which are illustrated in the accompanying drawings.

Figure 1:
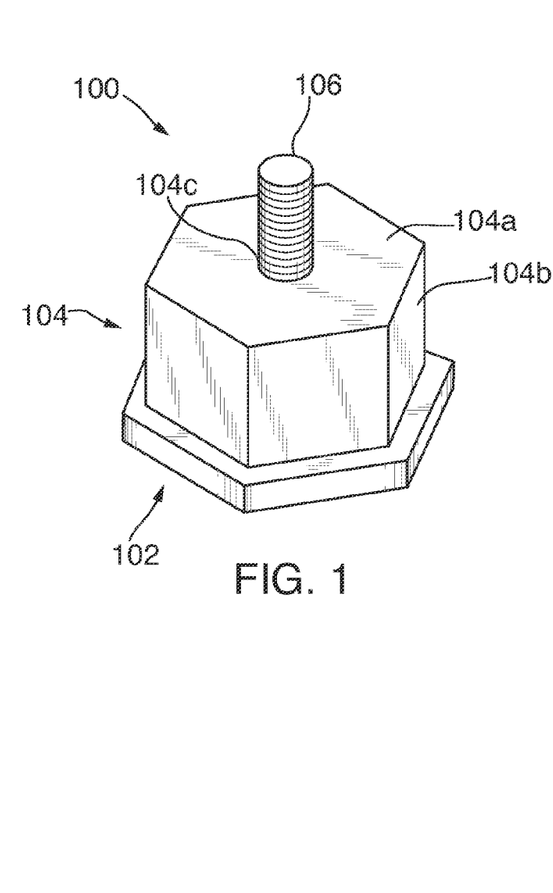
FIG. 1 depicts a perspective view of a fastening device in accordance with some embodiments.

FIG. 1 depicts a perspective view of a fastening device 100 in accordance with some embodiments. Fastening device 100 can include a base member 102, a capping nut 104, and a structural fastener 106.

Base member 102 of fastening device 100 can be coupled to a surface using a suitable fastener (e.g., a screw) in order to provide a mounting point for a structural member as described in more detail below with respect to FIGS. 6-7c. Once base member 102 is anchored to the surface, capping nut 104 can be coupled to base member 102 in any suitable manner. In some embodiments, capping nut 104 can threadably engage a portion of base member 102; however, other attachment methods may be employed including the use of one or more clips, for example.

Base member 102 can further have a number of flat edges 102c that can be held with a tool while base member 102 is coupled to the surface. These flat edges 102c, anchored by a suitable tool (e.g., a wrench) can serve to increase the amount of torque that can be applied to the fastener that couples base member 102 to the surface, thereby facilitating a closer and more water-tight fit than may be achieved with a rounded base member, for example.

Capping nut 104 can have a flat surface 104a at a closed end for sealing off base member 102 from ingress of moisture through the top of fastening device 100. Flat surface 104a can also provide a stable substrate for attaching a structural member as described below with respect to FIGS. 7a-7c. Capping nut 104 can also include outer walls 104b extending perpendicularly away from the closed end and flat surface 104a towards base member 102. A tool, such as a wrench, a hex driver, or a socket wrench, for example, can be used to threadably engage capping nut 104 to base member 102. In some embodiments, capping nut 104 can be hexagonal in shape, thus including six outer walls 104b.

A nut aperture 104c can be formed through flat surface 104a for receiving structural fastener 106. A head of structural fastener 106 (not shown) can be retained within capping nut 104 by virtue of the diameter of the head exceeding the diameter of nut aperture 104c of capping nut 104. In order to provide a water-tight seal of nut aperture 104c, the head (not shown) of structural fastener 106 can be press-fit into a recess formed in a surface of capping nut 104 opposing flat surface 104a. This recess and the head of structural fastener 106 can include one or more complementary locking features to prevent structural fastener 106 from rotating in nut aperture 104c.

Structural fastener 106 may be any suitable fastener for coupling a structural member to flat surface 104a of capping nut 104. For example, structural fastener 106 could be, according to various embodiments, a threaded stud, a bolt, a screw, or any other suitable fastener.

Figure 2:
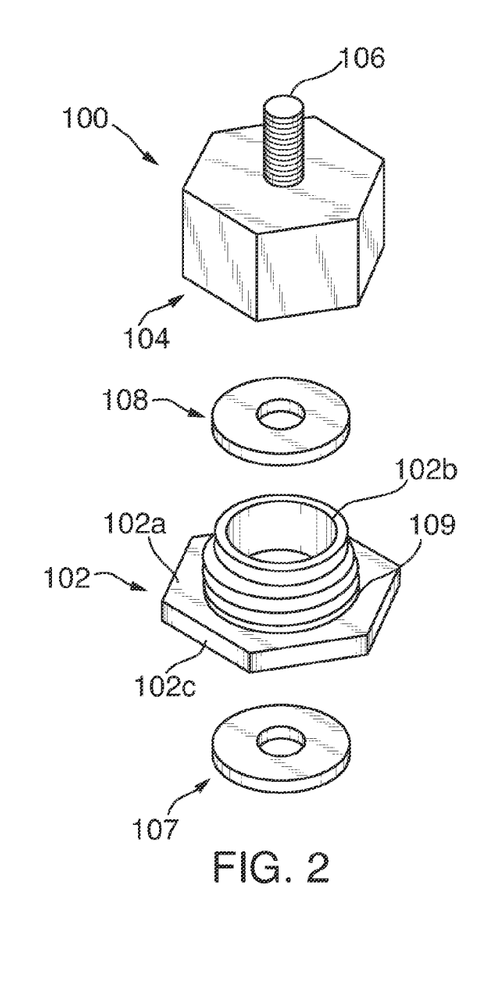
FIG. 2 depicts an exploded view of the fastening device of FIG. 1 in accordance with some embodiments.

FIG. 2 depicts an exploded view of fastening device 100 in accordance with some embodiments. In addition to base member 102, capping nut 104, and structural fastener 106, described above with respect to FIG. 1, fastening device 100 can include base sealing gasket 107 and nut sealing gasket 108. These sealing gaskets can further aid in ensuring that fastening device 100 forms a water tight seal with the surface on which it is mounted. In particular, nut sealing gasket 108 can prevent water from entering fastening device 100 through interstices between the base member 102 and capping nut 104 because water that enters fastening device 100 in this manner may pass through interstices between the surface fastener and the surface. Base sealing gasket 107 can prevent water from entering the surface beneath base member 102.

As depicted in FIG. 2, base member 102 can include base plate 102a and a threaded projection 102b extending from a first side of base plate 102a. Threaded projection 102b can have threads complementary to threads formed on the walls of a bore (not shown) of capping nut 104. O-ring 109 can be provided around a proximal end of threaded projection 102b in order to seal off fastening device 100 from ingress of moisture between capping nut 104 and base member 102. Thus, as capping nut 104 is screwed on to base member 102, the bottom edges of outer walls 104b, opposite flat surface 104a, can engage O-ring 109 to create a water-tight seal between capping nut 104 and base member 102. In some embodiments, O-ring 109 may be omitted, and a water-tight seal can be maintained using one or more sealing gaskets (e.g., sealing gaskets 107 and 108) and/or a thread-locking fluid applied to the threads of threaded projection 102b and/or threads of capping nut 104.

Base sealing gasket 107 can be coupled to a side of base plate 102a opposite threaded projection 102b in order to provide a water-tight seal between base member 102 and a surface on which fastening device 100 is mounted. Base sealing gasket 107 can be formed from a pliable material (e.g., rubber or silicone) such that it conforms to imperfections in the building surface and/or the fastening device in order to create a water-tight seal between fastening device 100 and the surface. As assembled, base sealing gasket 107 can be disposed between base member 102 and the surfaces and, therefore, can be protected from harmful UV radiation, which can reduce the useful lifetime of base sealing gasket 107.

According to some embodiments, base sealing gasket 107 can be coupled to a recess formed in base plate 102a using an interference fit. That is, base sealing gasket 107 can be deformed and pressed into a recess of base member 102 with a smaller diameter. Additionally or alternatively, base sealing gasket 107 can be fixedly coupled to base plate 102a using an adhesive, such as double-sided tape, a glue, or an epoxy, for example.

Nut sealing gasket 108 can be inserted into the bore of capping nut 104 in order to create a water-tight seal between threaded projection 102b and capping nut 104. Accordingly, when capping nut 104 is threadably coupled to base member 102, nut sealing gasket 108 can engage the distal end of threaded projection 102b and be pressed against an inner surface (not shown) of capping nut 104, opposite flat surface 104a, to create a water-tight seal between base member 102 and capping nut 104. According to some embodiments, nut sealing gasket 108 can be identical to base sealing gasket 107 such that the parts can be freely interchanged. In other embodiments, however, nut sealing gasket 108 and base sealing gasket 107 may differ in size and/or material composition. Furthermore, in embodiments in which it is not necessary to insert a fastener though nut sealing gasket 108, the gasket may lack the centrally located aperture of a washer-type annular gasket. Still further, like base sealing gasket 107, nut sealing gasket 108 can be fixedly coupled within capping nut 104 using an adhesive, such as double-sided tape, a glue, or an epoxy, for example.

Figure 3:
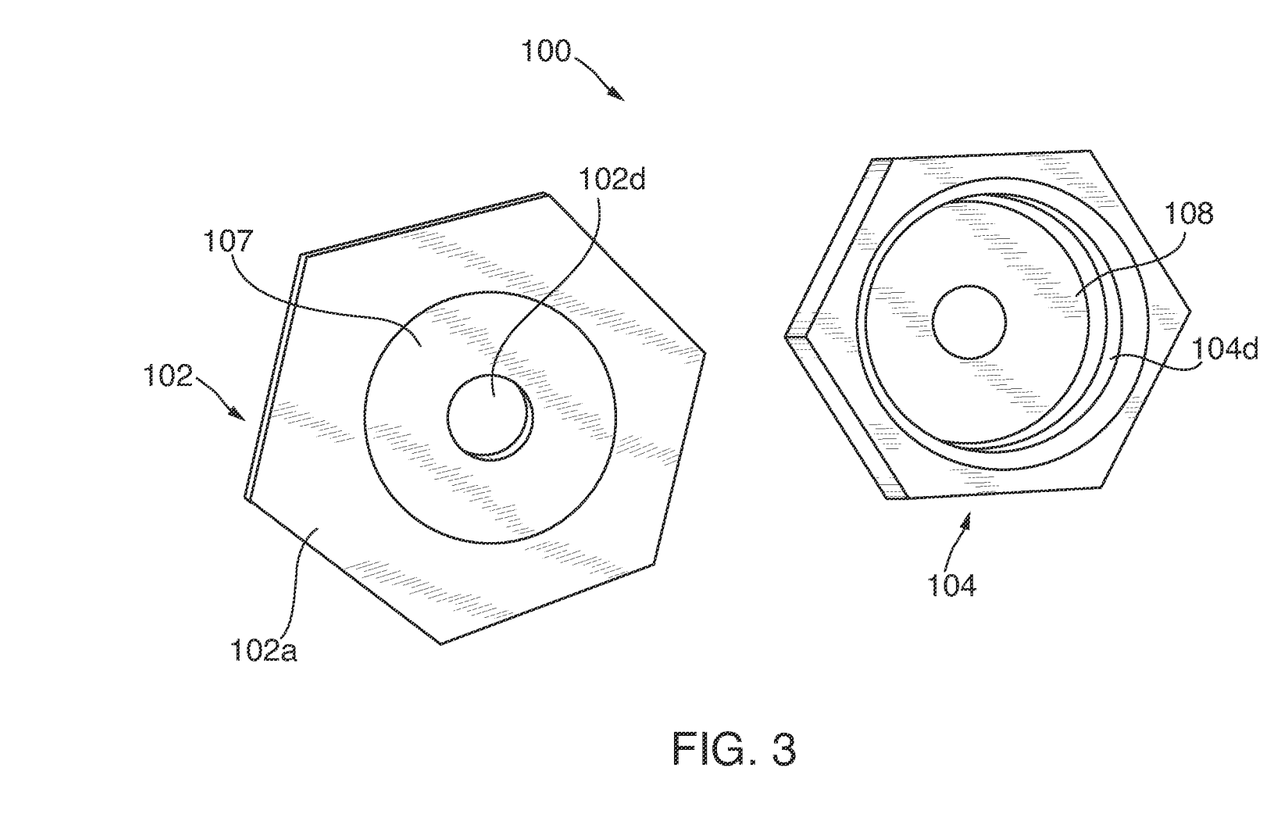
FIG. 3 depicts an unassembled perspective view of the fastening device of FIG. 1 in accordance with various embodiments.

FIG. 3 depicts an unassembled perspective view of fastening device 100 in accordance with various embodiments. In particular FIG. 3 shows a bottom perspective view of base member 102 uncoupled from capping nut 104.

Base sealing gasket 107 is depicted coupled to the bottom surface of base plate 102a, opposite the side of base plate 102a from which threaded projection 102b extends. A base aperture 102d can be formed through base plate 102a for receiving a securing fastener for coupling fastening device 100 to a surface (e.g., the roof of a building). When base sealing gasket 107 is coupled to base member 102, base aperture 102d can be aligned with the centrally located hole of base sealing gasket 107 such that the securing fastener can be inserted through both base member 102 and base sealing gasket 107.

According to some embodiments, base sealing gasket 107 can extend beyond the bottom surface of base plate 102a and compress when base member 102 is coupled to a surface. This compression of base sealing gasket 107 may aid in establishing a water-tight seal between fastening device 100 and the surface on which it is mounted. In some embodiments, the force generated as base member 102 is fastened to the surface can compress base sealing gasket 107 such that it is flush with the bottom surface of base plate 102a. In other embodiments, a gap can remain between base plate 102a and the surface on which it is mounted, the main point of contact between the surface and fastening device 100 being base sealing gasket 107.

As depicted in FIG. 3, capping nut 104 can include threaded bore 104d, which can extend partially from an open end towards a closed end of capping nut 104. The open end of capping nut 104 can rest adjacent to base plate 102a when capping nut 104 is coupled to base member 102, while the closed end of capping nut 104 can include flat surface 104a having nut aperture 104c. The threads formed on the walls of threaded bore 104d can be complementary to those formed on threaded projection 102b such that threaded bore 104d can threadably engage threaded projection 102b for coupling capping nut 104 to base member 102.

Furthermore, nut sealing gasket 108 may be disposed within threaded bore 104d. For this purpose, the diameter of nut sealing gasket 108 can match, or be slightly larger than the diameter of threaded bore 104d. In the latter embodiments, nut sealing gasket 108 can deform and form an interference fit within threaded bore 104d. Nut sealing gasket 108 can also be pressed up against an inner surface of the closed end of capping nut 104 that includes flat surface 104a. When capping nut 104 is coupled to base member 102, nut sealing gasket can be compressed between the distal end of threaded projection 102b and the inner surface of capping nut 104 in order to form a water-tight seal between the two components. Nut sealing gasket 108 can be used in addition to, or as an alternative to, O-ring 109. In further embodiments, both nut sealing gasket 108 and O-ring 109 may be omitted.

Figure 4:
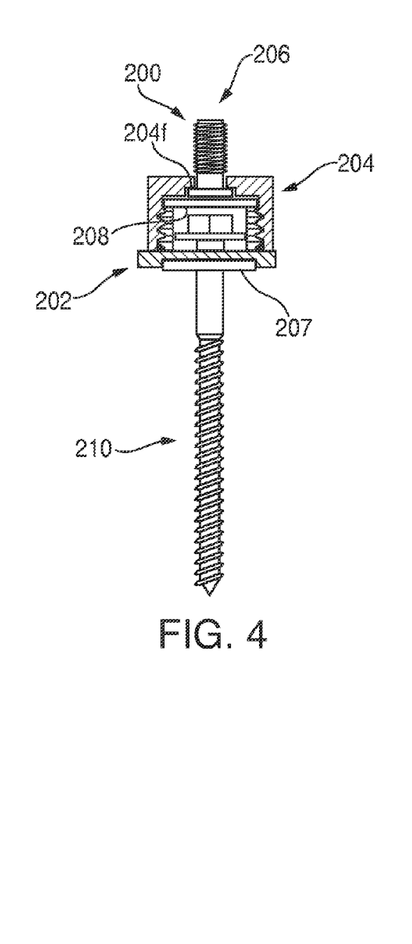
FIG. 4 depicts a cross-sectional view of a fastening device in accordance with various embodiments.

FIG. 4 depicts an assembled cross-sectional view of a fastening device 200, in accordance with various embodiments. Fastening device 200 can include base member 202, capping nut 204, structural fastener 206, base sealing gasket 207, and nut sealing gasket 208, which elements may correspond to base member 102, capping nut 104, structural fastener 106, base sealing gasket 107, and nut sealing gasket 108 of FIG. 1, respectively. Fastening device 200 can further include surface fastener 210 extending through an aperture in base member 202 and a hole in base sealing gasket 207.

Figure 5:
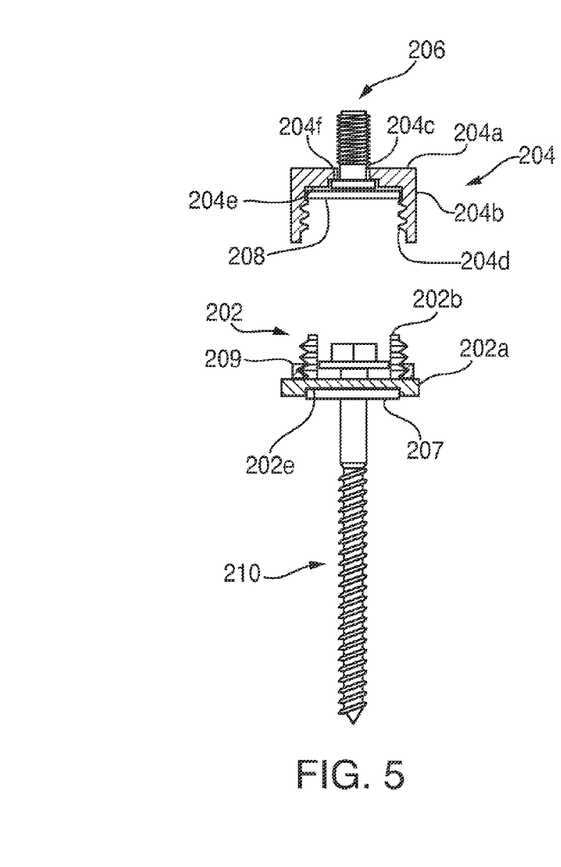
FIG. 5 depicts a disassembled cross-sectional view of the fastening device of FIG. 4 in accordance with various embodiments.

FIG. 5 depicts a disassembled cross-sectional view of fastening device 200 of FIG. 4, in accordance with various embodiments. In particular, FIG. 5 depicts capping nut 204, along with nut sealing gasket 208 and structural fastener 206, uncoupled from base member 202, base sealing gasket 207, O-ring 209 (which may correspond to O-ring 109 of FIG. 1), and surface fastener 210.

As depicted in FIG. 5, base member 202 can include base plate 202a, threaded projection 202b, and gasket recess 202e for receiving base sealing gasket 207. As described above, base sealing gasket 207 can be coupled to gasket recess 202e using an interference fit and/or an adhesive (e.g., double-sided tape, a glue, or an epoxy). Even in embodiments in which base sealing gasket 207 is disposed within gasket recess 202e of base member 202, base sealing gasket 207 can extend beyond the surface of base plate 202a leaving space for the gasket to compress when base member 202 is attached to a surface.

Further, threaded projection 202b may include a hollow bore, thus allowing insertion of surface fastener 210 through base member 202 (including a base aperture such as base aperture 102d of FIG. 3) and into the surface on which fastening device 200 is mounted. The head of surface fastener 210 may be smaller than the diameter of the hollow bore of threaded projection 202b and larger than the diameter of the base aperture, such that the head of surface fastener 210 can be retained within the hollow bore. Accordingly, coupling surface fastener 210 to a surface can cause base member 202 likewise to attach to the surface.

As described above with respect to capping nut 104, capping nut 204 can include flat surface 204a, outer walls 204b, nut aperture 204c, and threaded bore 204d, which can correspond to flat surface 104a, outer walls 104b, nut aperture 104c, and threaded bore 104d, respectively, of FIGS. 1-3. Additionally, capping nut 204 can include an inner surface 204e, which can oppose flat surface 204a, and recess 204f formed in inner surface 204e.

Structural fastener 206 can be inserted into capping nut 204 (e.g., through threaded bore 204d, recess 204f, and nut aperture 204c) on order to attach a structural member (e.g., a rail, an L-foot, or a standoff) to flat surface 204a of fastening device 200. To ensure a water-tight fit between structural fastener 206 and capping nut 204, the dimensions of recess 204f can closely match those of the head of structural fastener 206. Indeed, according to some embodiments, the head of structural fastener 206 may be press-fit into recess 204f to prevent moisture from entering fastening device 200 through any interstices remaining between nut aperture 204c and threaded bore 204d.

According to some embodiments, recess 204f and the head of structural fastener 206 may include complementary locking features to prevent structural fastener 206 from rotating within nut aperture 204c. These locking features may include simple polygonal shapes (e.g., squares or hexagons) or intricate locking members including one or more flanges. As one particular example, if structural fastener 206 is a hex bolt, recess 204f may be hexagonally shaped to receive the hexagonally shaped head of structural fastener 206 in a non-rotatable fashion. Generally speaking, the diameter of recess 204f can be greater than the diameter of nut aperture 204c, less than the diameter of threaded bore 204d, and roughly equal to the diameter of the head of structural fastener 206.

Nut sealing gasket 208 can be disposed within threaded bore 204d of capping nut 204 and adjacent to inner surface 204e. Thus, when capping nut 204 is coupled to base member 202, the distal end of threaded projection 202b can press nut sealing gasket 208 against inner surface 204e to create a water-tight seal between base member 202 and capping nut 204.

O-ring 209 may be disposed about the proximal end of threaded projection 202b abutting base plate 202a. Accordingly, when capping nut 204 is coupled to base member 202, O-ring 209 can create a water-tight seal at the joint between the two members.

Figure 6:
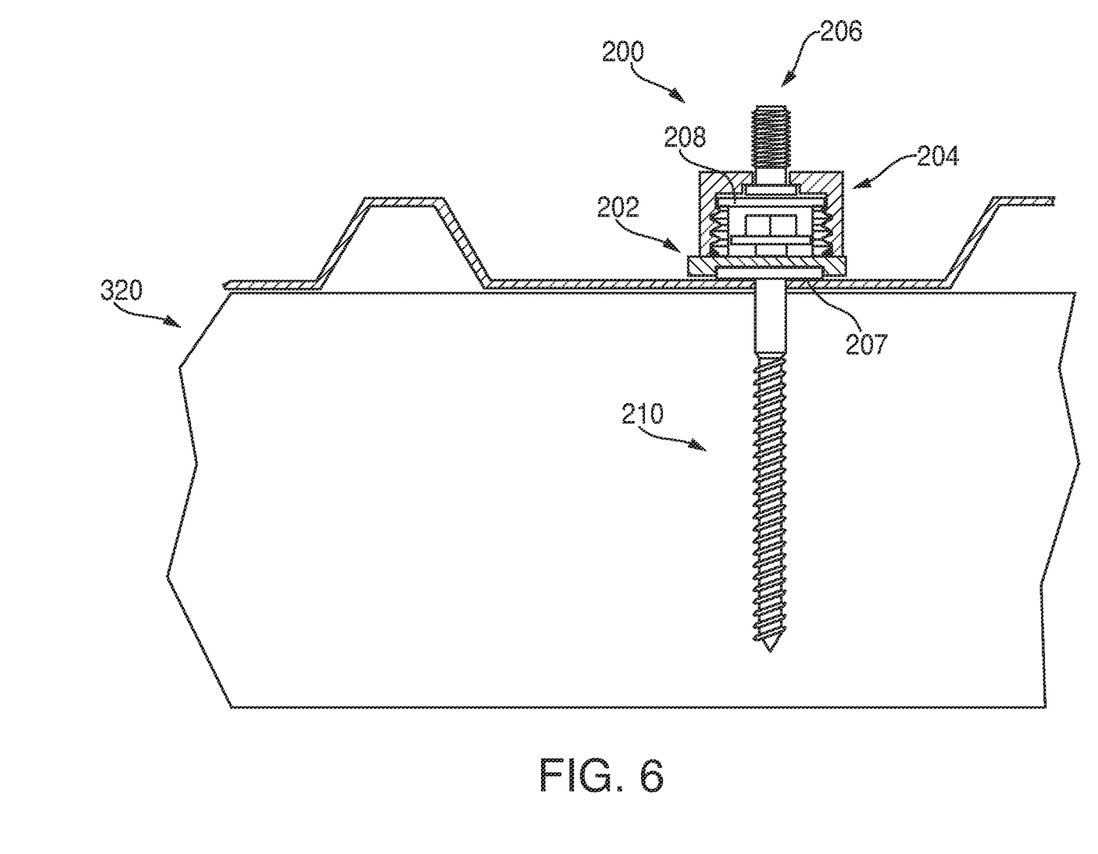
FIG. 6 depicts a cross-sectional view of the fastening device of FIG. 4 coupled to a surface in accordance with various embodiments.

FIG. 6 depicts a cross-sectional view of fastening device 200 coupled to a surface 320 in accordance with various embodiments. Surface 320 can be any suitable surface such as a wood rafter, a steel roll-formed building purlin, a roof, a wall, pavement, or the ground, for example. One skilled in the art will appreciate that the type of fastener used for surface fastener 210 can depend on the composition of surface 320. Thus, surface fastener 210 can be chosen depending on whether surface 320 is concrete, brick, wood, drywall, plaster, a composite, or combinations of the above, for example. Furthermore, surface fastener 210 can be used in coordination with an anchor provided in surface 320 if desired to improve the strength of attachment between fastening device 200 and surface 320.

Figure 7A:
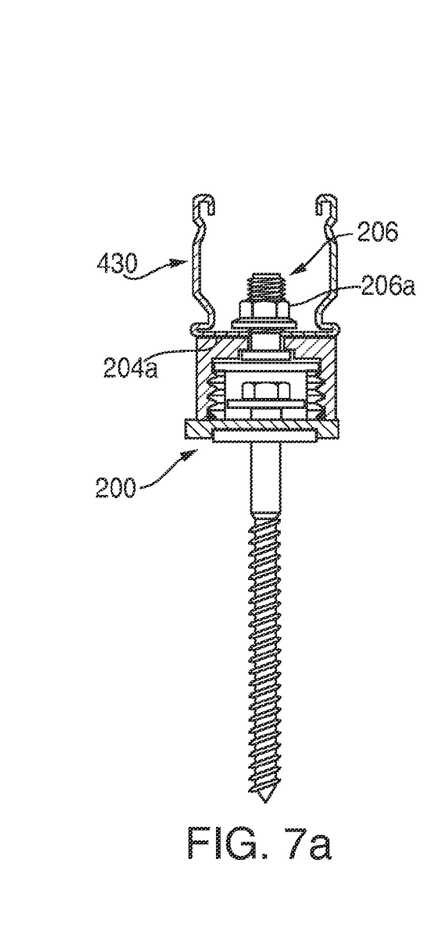
FIGS. 7a-7c depict cross-sectional views of a fastening device coupled to various structural members in accordance with various embodiments.
Figure 7B:
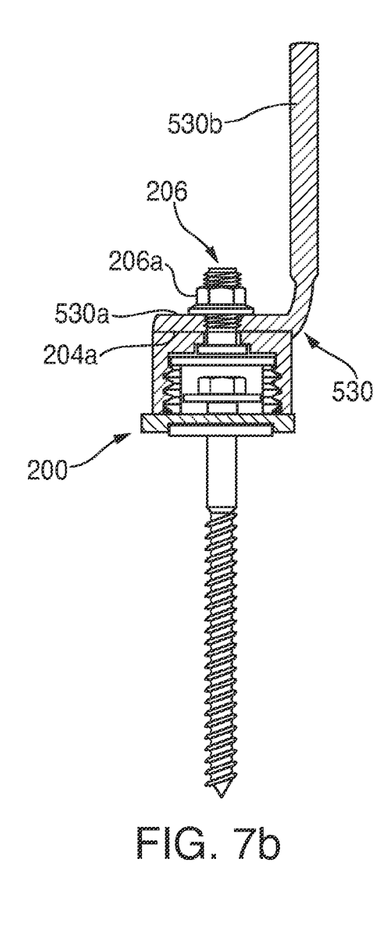
Figure 7C:
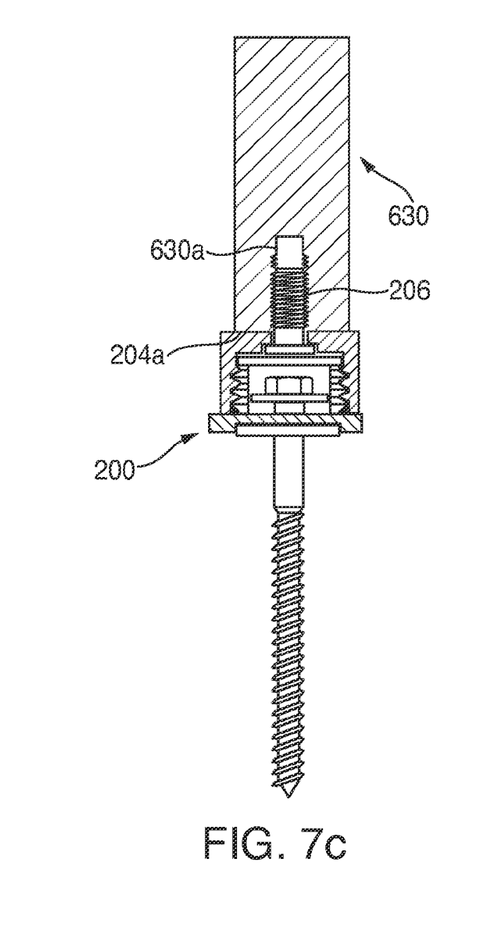

FIGS. 7a-7c depict cross-sectional views of fastening device 200 coupled to various structural members in accordance with various embodiments. In particular, FIG. 7a depicts fastening device 200 coupled to a rail 430.

Rail 430 can represent any suitable rail and need not take on the specific shape depicted in FIG. 7a. For example, the rail could be ZEE-shaped or U-Shaped. Further, rail 430 can be formed from any suitable materials and/or process. Thus, rail 430 could be of roll-form steel or extruded aluminum construction, for example.

A nut 206a may be provided to couple rail 430 to structural fastener 206 (and against flat surface 204a) of fastening device 200. Nut 206a can be any suitable nut with treads complementary to those of structural fastener 206. It should also be understood that structural fastener 206 and nut 206a can be replaced by any other suitable fastener or fasteners.

It should be recognized that for a full installation system of which rail 430 can form a part, rail 430 can be coupled to several fastening devices 200 along its length.

FIG. 7b depicts fastening device 200 coupled to an L-foot 530. L-foot 530 can have a horizontal section 530a that can be coupled to flat surface 204a of fastening device 200 using structural fastener 206 and nut 206a. A vertical section 530b an extend away from horizontal section 530a to provide a mounting point for one or more other structural members (e.g., a rail).

FIG. 7c depicts fastening device 200 coupled to a standoff 630. Standoff 630 can be a post having a threaded bore 630a with threads complementary to those of structural fastener 206. Standoff 630 can, therefore, be threadably engaged to structural fastener 206 and coupled to flat surface 204a of fastening device 200. Various other structural members for a building-mounted structure can be coupled to standoff 630.

Figure 8:
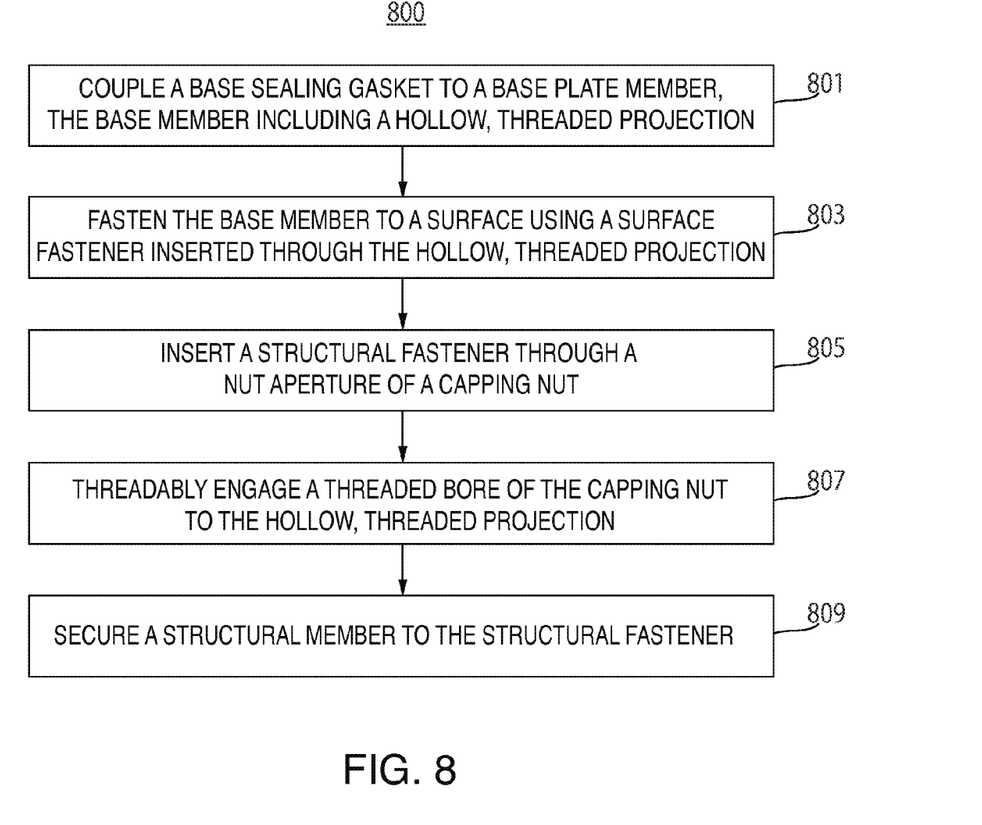
FIG. 8 is a flowchart of a process 800 for securing a component to a surface in accordance with some embodiments.

FIG. 8 is a flowchart of a process 800 for securing a component to a surface in accordance with some embodiments. Process 800 can start at step 801, which includes coupling a base sealing gasket to a base plate of a base member (e.g., base sealing gasket 207, base plate 202a, and base member 202 of FIG. 5, respectively). The base member can include a hollow, threaded projection (e.g., threaded projection 202b of FIG. 5). According to some embodiments, the base sealing gasket can be interference fit into a recess (e.g., recess 202e of FIG. 5) formed in the base plate. Additionally or alternatively, the base sealing gasket can be adhesively coupled to the base plate using double-sided tape, glue, and/or epoxy, for example. This base sealing gasket can be disposed between the base member and a surface on which the base member is mounted (e.g., surface 320 of FIG. 6) to prevent moisture from entering the surface.

Step 803 can include fastening the base member to a surface using a surface fastener (e.g., surface fastener 210 of FIG. 5) inserted through the hollow, threaded projection. Additionally, the surface fastener can be inserted through a base aperture (e.g., base aperture 202d of FIG. 5) formed in the base plate of the base member as well as a hole in the base sealing gasket. The surface fastener can be any suitable fastener for coupling the base member to the surface and may be chosen, for example based upon the material composition of the surface.

Step 805 can include inserting a structural fastener (e.g., structural fastener 206 of FIG. 5) through a nut aperture of a capping nut (e.g., nut aperture 204c of capping nut 204 of FIG. 5). According to some embodiments, a head of the structural fastener can be press-fit into a recess (e.g., recess 204f of FIG. 5) in the capping nut to provide a water-tight seal of the nut aperture. Furthermore, the head of the structural fastener and the recess can have complementary locking features to prevent the structural fastener from rotating in the nut aperture.

Step 807 can include threadably engaging a threaded bore (e.g., threaded bore 204d of FIG. 5) of the capping nut to the hollow, threaded projection. The threaded bore can extend partially through the capping nut from a first side towards a second side. At this point in the process, the mounting system assembled using process 800 can resemble the system shown in FIG. 6 in which fastening device 200 is coupled to surface 320.

Step 809 can include securing a structural member (e.g., rail 430 of FIG. 7a, L-foot 530 of FIG. 7b, or standoff 630 of FIG. 7c) to the structural fastener. Securing the structural member to the structural fastener can include, for example, threadably engaging a nut to the structural fastener to attach the structural member to a flat surface (e.g., flat surface 204a of FIG. 5) of the capping nut. The structural member may be a support structure for a building-mounted structure such as a solar panel installation, for example.

It is to be understood that the steps shown in process 800 are merely illustrative and that existing steps may be modified or omitted, additional steps may be added, and the order of certain steps may be altered.

While there have been described devices, systems, and methods for coupling a component to a surface, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A fastening device, comprising:
    a base member comprising:
        a base plate; and
        a threaded projection that extends away from a first side of the base plate;
    a capping nut comprising:
        a threaded bore configured to threadably engage to the threaded projection extending at least partially from an open end of the capping nut towards a closed end of the capping nut; and
        a nut aperture extending through the closed end;
    a base sealing gasket disposed on a second side of the base plate that is opposite the first side; and
    a nut sealing gasket abutting the closed end of the capping nut within the threaded bore and engaging a distal end of the threaded projection, wherein the distal end is opposite a proximal end of the threaded projection that abuts the first side of the base plate.

2. The fastening device of claim 1, wherein the second side of the base plate comprises a recess that receives the base sealing gasket.

3. The fastening device of claim 1, wherein a diameter of the threaded bore is greater than a diameter of the nut aperture.

4. The fastening device of claim 1, further comprising:
    a structural fastener extending through an opening in the nut sealing gasket and the nut aperture, wherein a diameter of a head of the structural fastener is greater than a diameter of the nut aperture and less than a diameter of the threaded bore.

5. The fastening device of claim 1, further comprising:
    a structural fastener extending through the nut aperture, wherein a diameter of a head of the structural fastener is greater than a diameter of the nut aperture and less than a diameter of the threaded bore.

6. The fastening device of claim 5, further comprising a structural member coupled to the structural fastener.

7. The fastening device of claim 6, wherein the structural member comprises one of:
    a rail;
    an L-foot; and
    a standoff.

8. The fastening device of claim 1, further comprising:
    a surface fastener extending through a base aperture in the base plate and an opening in the base sealing gasket, wherein the surface fastener is configured to couple the fastening device to a surface.

9. The fastening device of claim 1, wherein the closed end is defined by a flat outer surface arranged in a plane substantially perpendicular to a longitudinal axis of the threaded bore.

10. A method for securing a component to a surface, the method comprising:
    coupling a base sealing gasket to a first side of a base plate of a base member, the base member further comprising a hollow, threaded projection that extends away from a second side of the base plate;
    fastening the base member to a surface using a surface fastener inserted through the hollow, threaded projection and into the surface;
    inserting a structural fastener through a nut aperture of a capping nut;
    threadably engaging a threaded bore of the capping nut to the hollow, threaded projection; and
    inserting a nut sealing gasket into the threaded bore of the capping nut.

11. The method of claim 10, further comprising:
securing a structural member to the structural fastener.

12. The method of claim 10, wherein coupling the base sealing gasket to the base member comprises:
adhering the base sealing gasket to the base plate with an adhesive.

13. The method of claim 10, wherein inserting the structural fastener through the nut aperture of the capping nut comprises press fitting a head of the structural fastener into a recessed cavity adjacent to the aperture of the capping nut.

14. A mounting system, comprising:
a base member comprising:
 a base plate comprising a base aperture; and
 a hollow, threaded projection that extends from a first side of the base plate;
a base sealing gasket coupled to a second side of the base plate that is opposite the first side;
a capping nut comprising:
 a closed end comprising a nut aperture; and
 a threaded bore extending from an open end of the capping nut to the closed end and threadably engaging the hollow, threaded portion; and
a structural fastener inserted into the nut aperture;
a structural member coupled to the closed end using the structural fastener; and
a nut sealing washer disposed within the threaded bore, wherein the nut sealing washer:
 abuts an inner surface of the closed end; and
 engages a distal end of the hollow-threaded projection opposite a proximal end of the hollow-threaded projection that is adjacent to the base plate.

15. The mounting system of claim 14, further comprising:
a surface fastener inserted into the aperture in the base plate for securing the base member to a surface.

16. The mounting system of claim 14, further comprising:
an O-ring provided around a proximal end of threaded projection that abuts the base plate.

17. The mounting system of claim 14, the structural member comprising one of:
a rail;
an L-foot; and
a standoff.

18. The mounting system of claim 14, the base plate further comprising:
a plurality of flat edges.

* * * * *